United States Patent
Iso-Sipilä et al.

(10) Patent No.: US 8,069,030 B2
(45) Date of Patent: Nov. 29, 2011

(54) LANGUAGE CONFIGURATION OF A USER INTERFACE

(75) Inventors: Juha Iso-Sipilä, Tampere (FI); Olli Viikki, Nokia (FI)

(73) Assignee: Nokia Corporation, Espoo (FI)

( * ) Notice: Subject to any disclaimer, the term of this patent is extended or adjusted under 35 U.S.C. 154(b) by 571 days.

(21) Appl. No.: 10/580,378

(22) PCT Filed: Dec. 9, 2004

(86) PCT No.: PCT/FI2004/050183
§ 371 (c)(1),
(2), (4) Date: May 22, 2006

(87) PCT Pub. No.: WO2005/059720
PCT Pub. Date: Jun. 30, 2005

(65) Prior Publication Data
US 2007/0073530 A1 Mar. 29, 2007

(30) Foreign Application Priority Data
Dec. 19, 2003 (FI) ..................................... 20035243

(51) Int. Cl.
*G06F 17/28* (2006.01)
(52) U.S. Cl. ........ 704/3; 379/67.1; 379/88.06; 455/433; 455/456.1; 704/10; 704/2; 704/251; 704/260; 704/270.1; 704/277; 704/8; 704/9; 704/203
(58) Field of Classification Search .................. 704/251, 704/270.1, 3, 277, 10, 2, 260, 8, 9, 203; 379/67.1, 379/88.06; 455/433, 456.1
See application file for complete search history.

(56) References Cited

U.S. PATENT DOCUMENTS

| | | | | |
|---|---|---|---|---|
| 5,440,615 A | * | 8/1995 | Caccuro et al. | 379/88.06 |
| 5,612,872 A | * | 3/1997 | Fujita | 704/2 |
| 5,917,484 A | | 6/1999 | Mullaney | 345/333 |
| 5,978,678 A | * | 11/1999 | Houde et al. | 455/433 |
| 6,061,646 A | * | 5/2000 | Martino et al. | 704/3 |
| 6,069,939 A | * | 5/2000 | Fung et al. | 379/67.1 |
| 6,292,772 B1 | * | 9/2001 | Kantrowitz | 704/9 |
| 6,385,586 B1 | * | 5/2002 | Dietz | 704/277 |
| 6,532,446 B1 | * | 3/2003 | King | 704/270.1 |
| 6,601,029 B1 | * | 7/2003 | Pickering | 704/257 |
| 6,941,273 B1 | * | 9/2005 | Loghmani et al. | 705/26 |
| 6,963,836 B2 | * | 11/2005 | Van Gestel | 704/251 |
| 7,028,027 B1 | * | 4/2006 | Zha et al. | 1/1 |
| 7,130,801 B2 | * | 10/2006 | Kitahara et al. | 704/277 |
| 7,231,421 B2 | * | 6/2007 | Kawakura et al. | 709/203 |

(Continued)

FOREIGN PATENT DOCUMENTS

EP 1 061 459 A2 12/2000

(Continued)

*Primary Examiner* — Michael Colucci
(74) *Attorney, Agent, or Firm* — Alston & Bird LLP (57) ABSTRACT

The invention relates to an electronic device, which includes a voice user interface (VUI), speech-recognition devices (SR) for implementing the voice user interface (VUI), and memory (MEM), in which language-configuration data is arranged for the user interface (VUI, UI), including several language packages (LP1-LP9), in which packages (LP1-LP9) several languages (L1-L34) are grouped, of which at least some of the languages (L1-L34) may belong to several language packages (LP1-LP9), and at least one language package (LP1) is arranged to be selected for use in the user interface (VUI, UI). In the invention, the language package (LP1-LP9) is selected by the device.

18 Claims, 6 Drawing Sheets

U.S. PATENT DOCUMENTS

| | | | |
|---|---|---|---|
| 7,403,888 B1 * | 7/2008 | Wang et al. | 704/2 |
| 7,574,217 B1 * | 8/2009 | Leung et al. | 455/456.1 |
| 2001/0029455 A1 * | 10/2001 | Chin et al. | 704/277 |
| 2002/0177993 A1 | 11/2002 | Veditz et al. | 704/8 |
| 2003/0023440 A1 | 1/2003 | Chu | 704/249 |
| 2004/0030554 A1 * | 2/2004 | Boxberger-Oberoi et al. | 704/260 |
| 2004/0193426 A1 | 9/2004 | Maddux et al. | 704/275 |
| 2005/0114114 A1 * | 5/2005 | Rudolph | 704/10 |
| 2005/0125218 A1 * | 6/2005 | Rajput et al. | 704/8 |

FOREIGN PATENT DOCUMENTS

| | | |
|---|---|---|
| EP | 1 206 660 A2 | 10/2001 |
| WO | WO-99/43146 A2 | 8/1999 |
| WO | WO-2004/019207 A1 | 3/2004 |

* cited by examiner

Fig. 1

| | | | | | |
|---|---|---|---|---|---|
| Scandinavia LP1 | Countries | Finland | Sweden | Norway | Denmark |
| | | Iceland | | | |
| | Languages | Finnish L1 | Swedish L2 | Norwegian L3 | Icelandic L4 |
| | | Danish L5 | UK English L6 | German L7 | |
| Russia & Baltics LP2 | Countries | Estonia | Lithuania | Latvia | Russia |
| | | | | | |
| | Languages | Estonian L8 | Lithuanian L9 | Latvian L10 | Russian L11 |
| | | UK English L6 | German L7 | | |
| Northern Europe LP3 | Countries | Germany | Netherlands | Belgium | Luxembourg |
| | | United Kingdom | Ireland | | |
| | Languages | German L7 | Dutch L12 | French L13 | UK English L6 |
| Central Europe LP4 | Countries | Czech Republic | Slovakia | Austria | Switzerland |
| | | France | | | |
| | Languages | Czech L14 | German L7 | UK English L6 | French L13 |
| | | Slovak L15 | Italian L16 | | |
| Eastern Europe LP5 | Countries | Belarus | Ukraine | Romania | Hungary |
| | | Bulgaria | Poland | Croatia | Slovenia |
| | Languages | Ukranian L17 | Romanian L18 | Hungarian L19 | Bulgarian L20 |
| | | Polish L21 | UK English L6 | German L7 | Russian L11 |
| | | Croatian L22 | Slovenian L23 | | |
| Southern Europe LP6 | Countries | Greece | Turkey | Italy | Spain |
| | | Portugal | | | |
| | Languages | Greek L24 | Turkish L25 | Italian L16 | Spanish L26 |
| | | Portuguese L27 | UK English L6 | German L7 | French L13 |
| Middle East LP7 | Countries | Middle East | Persian Gulf | | |
| | Languages | Arabic L28 | UK English L6 | French L13 | |
| North & South America LP8 | Countries | USA | Canada | Mexico | Argentina |
| | | Brazil | | | |
| | Languages | US English L29 | Canadian French L30 | Mexican Spanish L31 | Brazilian Portuguese L32 |
| China LP9 | Countries | China | Hong Kong | Taiwan | Singapore |
| | Languages | Mandarin L33 | Cantonese L34 | US English L29 | |

Fig. 2

| LanguageOnlyInOneLanguagePackage | Finnish L1 | Swedish L2 | Norwegian L3 | Danish L5 |
|---|---|---|---|---|
| | Icelandic L4 | Estonian L8 | Lithuanian L9 | Latvian L10 |
| | Dutch L12 | Czech L14 | Slovak L15 | Ukranian L17 |
| | Romanian L18 | Hungarian L19 | Bulgarian L20 | Polish L21 |
| | Croatian L22 | Slovenian L23 | Greek L24 | Turkish L25 |
| | Spanish L26 | Portuguese L27 | Arabic L28 | Canadian French L30 |
| | Mexican Spanish L31 | Brazilian Portuguese L32 | Mandarin L33 | Cantonese L34 |
| | | | | |

Fig. 3a

| LanguageInSeveralLanguagePackages | UK English L6 | German L7 | Italian L16 | Russian L11 |
|---|---|---|---|---|
| | French L13 | US English L29 | | |

Fig. 3b

| NativeLanguagePackages | Language | Language package |
|---|---|---|
| | UK English L6 | Northern Europe LP3 |
| | German L7 | Northern Europe LP3 |
| | Italian L16 | Southern Europe LP6 |
| | Russian L11 | Russia & Baltics LP2 |
| | French L13 | Central Europe LP4 |
| | US English L29 | North & South America LP8 |

| Case | Spoken language =VUIL | Language package based on spoken language LP(VUIL) | UI language = UIL | Language package based on UI and spoken language LP(UIL, VUIL) |
|---|---|---|---|---|
| a | Finnish = L1 | Scandinavian = LP1 | Any | Scandinavian = LP1 |
| b | German = L7 | LP1 - LP6 | Any | Northern Europe = LP3 |
| c | German = L7 | LP1 - LP6 | Italian = L16 | Southern Europe = LP6 |
| d | German = L7 | LP1 - LP6 | Estonian = L8 | Russia & Baltics = LP2 |
| e | USEnglish = L29 | LP8, LP9 | Any | North & South America = LP8 |
| f | UKEnglish = L6 | LP1 - LP7 | Finnish = L1 | Scandinavian = LP1 |
| g | UKEnglish = L6 | LP1 - LP7 | German = L7 | Northern Europe = LP3 |

| | UI Language UIL | Spoken Language VUIL | Language package LPx |
|---|---|---|---|
| | UKEnglish L6 | UK English L6 | Northern Europe LP2 |
| | UKEnglish L6 | German L7 | Northern Europe LP2 |
| | UKEnglish L6 | Italian L16 | Southern Europe LP6 |
| | UKEnglish L6 | Russian L11 | Russia & Baltics LP2 |
| | UKEnglish L6 | French L13 | Central Europe LP4 |
| | UKEnglish L6 | US English L29 | North & South America LP8 |
| | German L7 | UK English L6 | Northern Europe LP3 |
| | German L7 | German L7 | Northern Europe LP3 |
| | German L7 | Italian L16 | Central Europe LP4 |
| | German L7 | Russian L11 | Eastern Europe LP5 |
| | German L7 | French L13 | Central Europe LP4 |
| | German L7 | US English L29 | North & South America LP8 |
| | Italian L16 | UK English L6 | Southern Europe LP6 |
| | Italian L16 | German L7 | Southern Europe LP6 |
| | Italian L16 | Italian L16 | Southern Europe LP6 |
| SpecialCases | Italian L16 | Russian L11 | Eastern Europe LP5 |
| | Italian L16 | French L13 | Central Europe LP4 |
| | Italian L16 | US English L29 | North & South America LP8 |
| | Russian L11 | UK English L6 | Russia & Baltics LP2 |
| | Russian L11 | German L7 | Eastern Europe LP5 |
| | Russian L11 | Italian L16 | Central Europe LP4 |
| | Russian L11 | Russian L11 | Russia & Baltics LP2 |
| | Russian L11 | French L13 | Central Europe LP4 |
| | Russian L11 | US English L29 | North & South America LP8 |
| | French L13 | UK English L6 | Central Europe LP4 |
| | French L13 | German L7 | Northern Europe LP3 |
| | French L13 | Italian L16 | Central Europe LP4 |
| | French L13 | Russian L11 | Eastern Europe LP5 |
| | French L13 | French L13 | Central Europe LP4 |
| | French L13 | US English L29 | North & South America LP8 |
| | US English L29 | UK English L6 | Northern Europe LP3 |
| | US English L29 | German L7 | Northern Europe LP3 |
| | US English L29 | Italian L16 | Southern Europe LP6 |
| | US English L29 | Russian L11 | Russia & Baltics LP2 |
| | US English L29 | French L13 | Central Europe LP4 |
| | US English L29 | US English L29 | North & South America LP8 |

LANGUAGE CONFIGURATION OF A USER INTERFACE

FIELD OF THE INVENTION

The present invention relates to an electronic device, which includes
- a voice user interface and a possible terminal user interface for controlling the functions of the device,
- speech-recognition devices for implementing the voice user interface, and
- memory, in which language-configurations data is arranged for the user interface, including several language packages, in which language packages several languages are grouped, at least some of which languages may belong to several language packages and of which language packages at least one is arranged to be selected for use in the user interface.

In addition, the invention also relates to a method in an electronic device, for performing language configurations of a user interface, and a computer program meant for to be executed in an electronic device according to the invention.

BACKGROUND OF THE INVENTION

A great many speaker-independent voice user interfaces (VUI) have recently been developed for various electronic devices. Such user interfaces require language configurations in several languages. Some manufacturers' speaker-independent speech-recognition systems nowadays support up to tens of languages.

Due to the devices' limited memory properties and the limited processing capacity of speech-recognition systems, all languages cannot be included in a single package totality, but they must be divided into smaller language packages. If too many languages were to be arranged in a single data package, this would reduce the accuracy of the speech recognition. In addition the 'training' of the acoustic speech models can then be optimized for several language areas, which will achieve advantages, for example, in the recognition of different dialects. Each language package can include several languages, the number of which can be, for example, 4-10 languages. Language can be arranged into language packages, for example, according to a geographical division into regions. Due to this, the language package to be used must be separately selected for the user interfaces of the device, for example, for a voice user interface, which language package is subsequently used, for example, in speech recognition.

The languages that are characteristic of particular geographical regions, for example, can be arranged into separate language packages. In addition to these languages, the language packages can include some widely spread and general used world languages (for example, English, Portuguese, Spanish, German, Russian, Italian), which for some reason may be wished to be included in several language packages. According to this division, each supported language is included in at least one language package while some languages are in several language packages. In this case, and in this application in general, a dialect of a language can also be understood as a language.

Multi-language systems are, at present, still quite rare, due to which only quite rough means of implementing the selection of a language package are known in the prior art. In these, users must themselves decide and select manually from the device's user interface the language package to be used at each time. However, this has the weakness that this allows the wrong language package to be selected, which can lead to poor performance of the speech recognition. In addition, if the device is not notified at all of the speech language, the operation of the speech recognition will be even poorer.

The language package selection presently carried out by the user is subject to error. One example of this is a situation in which, for example, a Russian user wishes to use, for example, German as the VUI language (i.e. the language by which they wish to control the device by speech) and Russian as the user interface language (i.e. the language that is used, for example, in the graphical user interface GUI of the device). As German is a global language, it is arranged in several language packages and the user will then have several alternatives from which to select a language package, which in itself can lead to undesirable discomfort in the usability of the device.

Users who do not understand the often rather cryptic significance of the language packages and their contents may select the German for use in speech recognition, for example, from the Central Europe language package. This selection will prevent the user from selecting, for example, the Russian they desire as the user interface language, because for reasons of appropriateness it has not been regarded as necessary to include Russian in the Central Europe language package. Such a situation may thoroughly confuse the user and make them incapable of re-selecting a language package. Generally, it is not particularly user-friendly to allow such a situation to arise.

Further, there may be even large regional differences in the pronunciation of world languages that are spoken in several different regions. For example, Slavs pronounce English differently to native English speakers. A similar typical difference also exists between, for example, the German spoken by Swiss/Austrians and that spoken by native Germans. This too may lead to the wrong language package being selected and the subsequent 'faulty' operation of speech recognition and in turn also of the voice user interface.

One state of the art is disclosed in U.S. Pat. No. 5,917,484, in which the language to be used in an electronic device is selected, particularly in the case of a computer. This solution, however, in no way deals with voice user interfaces or the speech recognition functionality used in them, in which the problems described above are considerable. Also, in WO-publication 2004/019207 A1 (Nokia Corporation) has been described the prior art relating to the user interface language setups particularly for editing of the language sets. Therein either is not discussed about the language package selection problems that relate to the voice user interfaces.

SUMMARY

The present invention is intended to create a new type of electronic device with a more highly developed user interface language arrangement and a method in an electronic device for performing the language configuration of a user interface.

The invention relates particularly to voice user interfaces and the selection of a language package to be used in speech recognition, as well as to the arrangement of language configurations data in an electronic device.

The device and method according to the invention are characterized by the device registering language information for deciding the language-package selection. The language information includes information on at least a first language for at least one user interface. On the basis of this language, the device can, according to a first embodiment, select the language package. In order to perform the selection, information on the languages included in the language packages is arranged in the device.

In the invention, the language package that it is desired to use in the user interface is now selected by the operation of the device, for example, on the basis of language information registered from the user. In that case, there can be a data structure arranged in the device, which contains this language-package information. From the language information provided by the user, the device can, in each selection-alternative situation, select the most suitable language package for use in the device, which is linked to this language information according to a set criterion.

According to one embodiment, the language package can be selected on the basis of information concerning even a single language. According to a second embodiment, if the language-package selection cannot be performed sufficiently unambiguously, information on a second language can be used in addition. In that case, the language package can be selected on the basis of these languages, in the set manner.

According to one embodiment, a native-language package can be defined for each language, which is selected for use as the default value in the case of certain special selection situations. Regardless of the language selection of the user, in this case the best language package about its suitability is always got for the use.

According to one embodiment, the language information registered in the device can include information, for example, of the language spoken by the user, and which they wish to use in the voice user interface. If, for example, the language intended to be used in the device user interface differs from the user's speech-language selection, the language package cannot necessarily be selected unambiguously. A second example of such a situation may be one in which the language desired for use in the voice user interface is arranged in several language packages, so that the selection of a language package will also not necessarily be unambiguous. In the invention, the problem is solved by the device selecting the language-package automatically, for example, on the basis of language information received from the user.

With the aid of the invention, the advantage is gained that users need not themselves select an appropriate language package that is difficult to understand, so that the wrong language package may be selected. In the case according to the invention, the language package can be selected unambiguously and automatically, if the user states, in a selected order, the spoken language and the language of the user interface, of which even the second language need not be stated in every situation.

According to one embodiment, a look-up table of the language-selection combinations can be arranged in the memory of the device, which displays either all, or at least most of the language-selection combinations relating to the selection alternatives of the user interface languages, or, on the other hand, only the possible language-selection combinations. A language package that can be selected for use is attached to each combination. In addition, that the best language package becomes selected now, also the selections of the weirdest of all and the illogical of all can even be realized unambiguously without that there would be a need for annoy or confuse the user about his or hers selection.

The other characteristic features of the device and method according to the invention will become apparent from the accompanying Claims and additional advantages gained are itemized in the description portion.

BRIEF DESCRIPTION OF THE DRAWINGS

In the following, the electronic device and the related method according to the invention, which are not restricted to the embodiments disclosed in the following, are examined in greater detail with reference to the accompanying drawings, in which FIG. 3e shows one embodiment of a look-up table for use in selecting a language package, as a list for determining special cases.

DETAILED DESCRIPTION

Figure 1:
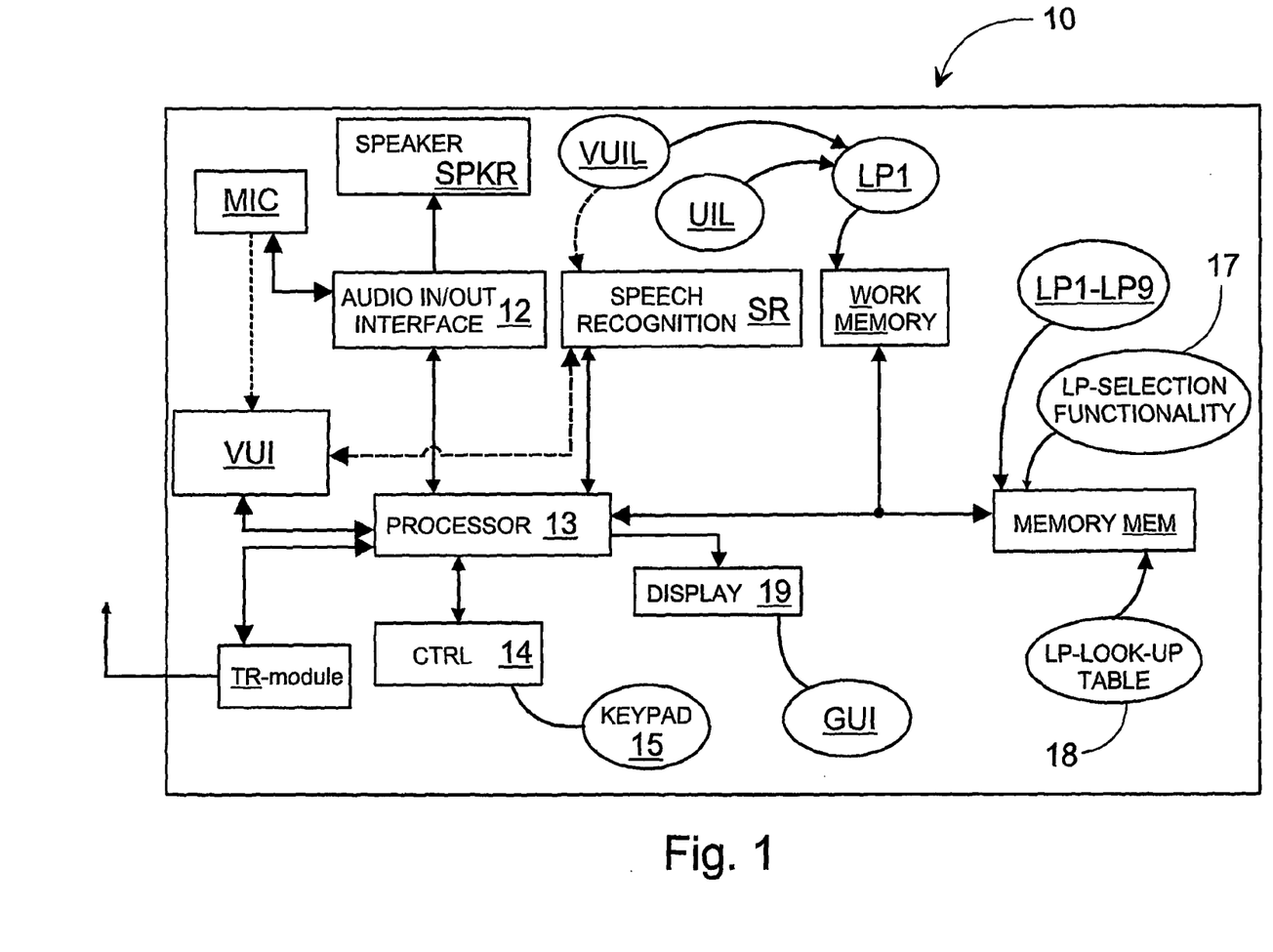
FIG. 1 shows a rough block diagram of one example of an electronic device according to the invention.

FIG. 1 shows a rough block diagram of one example of an electronic device 10 according to the invention, which in the following is described as an embodiment in the case of a mobile station. It should be noted that the category of electronic devices, to which the invention can be applied, must be understood to be extremely wide. Some other examples of devices include portable and hand-held devices in general, such as PDA (Personal Digital Assistant) type devices (e.g., Palm, Vizor), palm computers, smart phones, multimedia devices, camera devices, game consoles, telephones, and dictation machines. In addition, the invention can also be applied in, for example, video/DVD devices, satellite/digibox tuners, televisions, telefax devices, copiers, computers, vending and slot machines, and other similar electronic devices. However, the devices according to the invention mainly have the common feature that they include a Voice User Interface VUI and more particularly such a voice user interface, which is implemented using speech recognition function SR.

The mobile station 10 shown in FIG. 1 may be of a type that is, as such known, components of which that are irrelevant in terms of the invention, such as the transmitter/receiver TR, require no further explanation in this connection.

The functions of the device 10 can be controlled using the processor unit DSP/CPU 13, which is used to control, for instance, information displayed on the display component 19 of the device 10, for example, in a graphical user interface GUI. The operation of the processor unit 13 can be controlled using control devices 14, which can be implemented, for example, as a keypad 15, or various switches. The functions of the device 10 can be controlled through a Terminal User Interface TUI, for example, by using a graphical user interface GUI displayed on the display 19 of the device 10 and/or, on the other hand, also by using a voice user interface VUI. The user interfaces VUI/GUI can, besides permitting the control of the device 10, also provide information on the current state of the device 10.

The mobile station 10 may include, as user interfaces, a voice user interface VUI and a graphical user interface GUI, in general one or several user interfaces UI. These can be used in parallel or even singly to control the functions of the device 10.

In order to implement a voice user interface VUI, the device 10 can include speech recognition devices SR and an audio in/out interface 12, which can include microphone devices MIC and loudspeaker devices SPKR. Speech recognition SR, which can be implemented in a manner that is, as such, known, requires language-configuration data LP1-LP9 in order to function. The language-configuration data is arranged in the memory devices MEM of the device 10, in a set manner.

Figure 2:
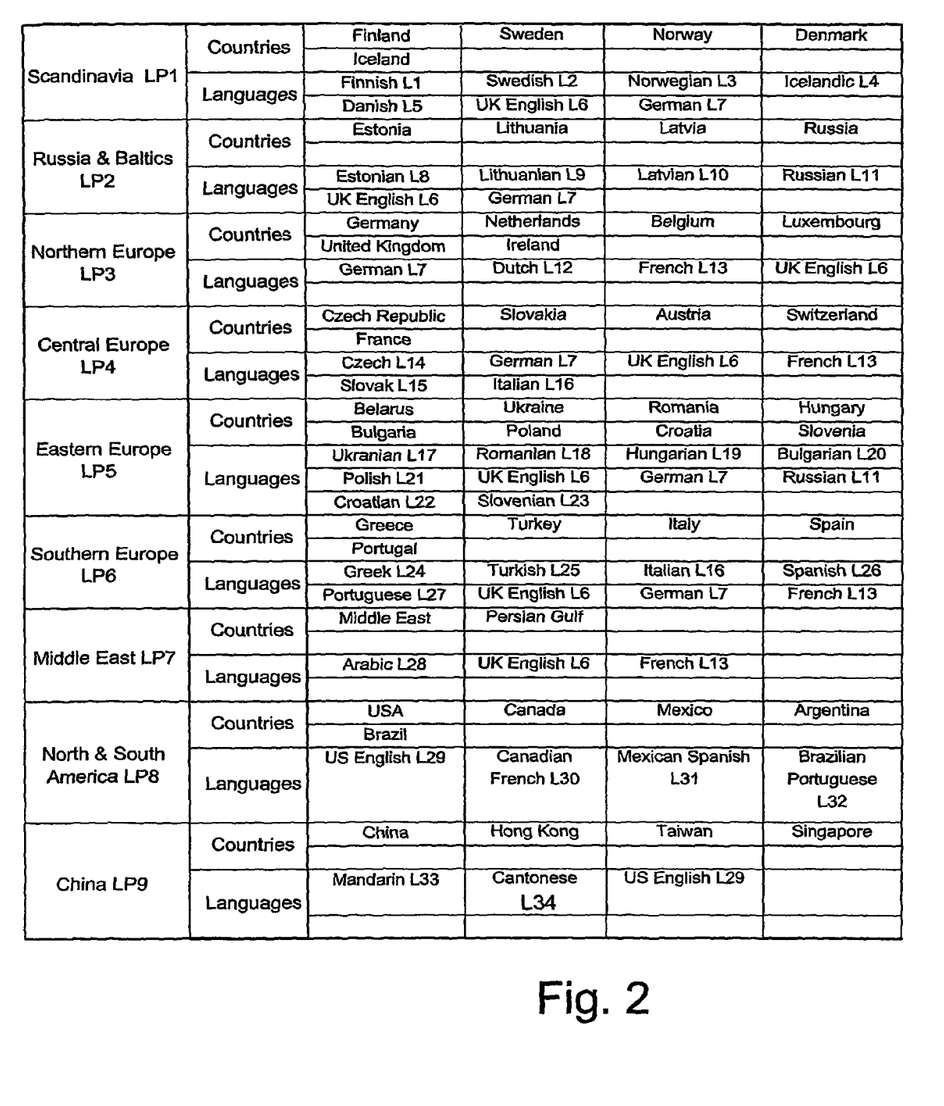
FIG. 2 shows one embodiment of the languages arranged in each language package.
Figure 3A:
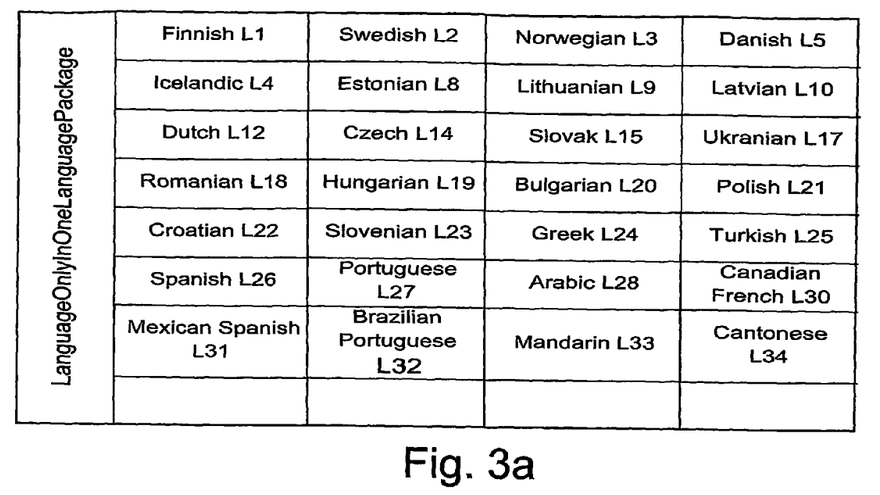
FIG. 3a shows an example of a language list, each language in which is in only one language package.
Figure 3B:
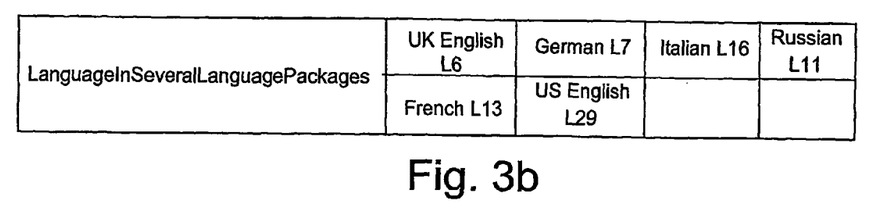
FIG. 3b shows an example of a language list, each language in which is in several language packages.

FIG. 2 shows one schematic example of the language-package division. Several language packages LP1-LP9 can be formed in the memory MEM of the device 10 from the language-configuration data. One or several, for example 4-10, of the languages LP1-L34 that can be selected for use in the user interface VUI/GUI are grouped in a selected manner in language packages LP1-LP9. Each of the available languages L1-L34 belongs to at least one of the language packages LP1-LP9. Table 3a shows an example of a list of the languages that are only in one language package LP1-LP9, in the case of the embodiment in question. In addition, at least some of the languages L6, L7, L11, L13, L16, L29 can belong to several, for example at least two, of the language packages LP1-LP9. Table 3b shows an example list of these languages that belong to several language packages LP1-LP9, in the case of the embodiment in question.

Figure 3C:
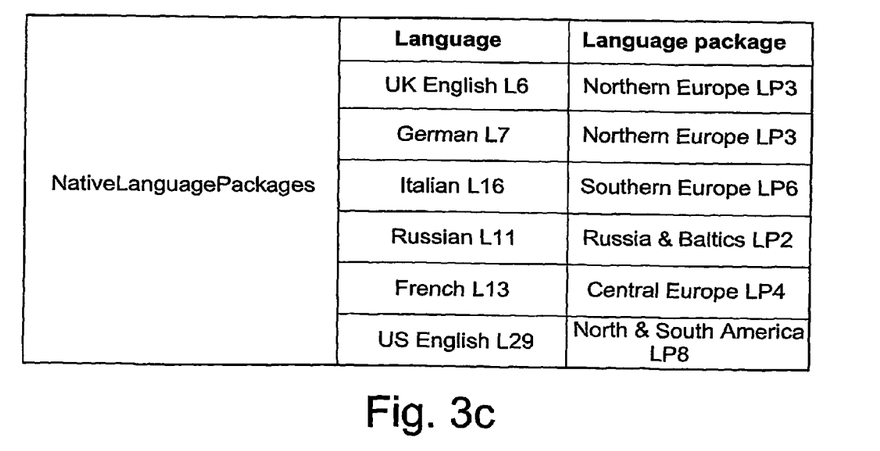
FIG. 3c shows an example of a native-language package list for languages in several language packages.
Figure 3D:
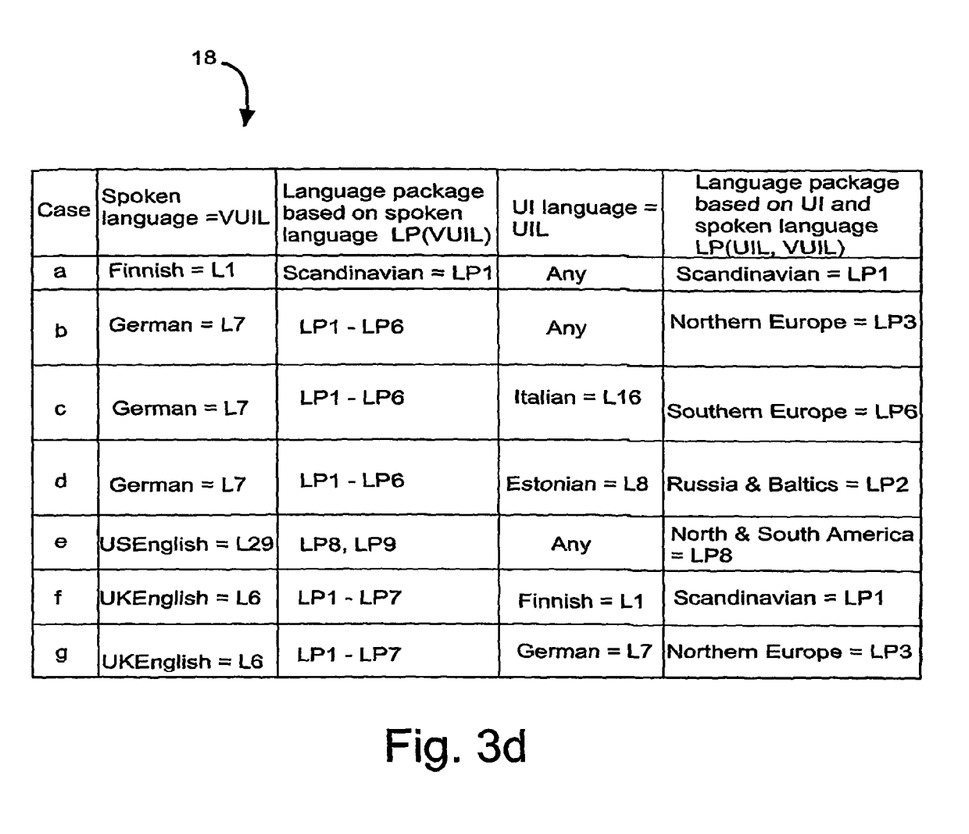
FIG. 3d shows one embodiment of a look-up table for use in selecting a language package, as a partial list.

With reference to FIGS. 2, 3d, and 3e, one criterion for determining the language division of the language packages LP1-LP9 are the languages characteristic of each geographical region, or even of countries, according to which the language packages LP1-LP9 can also be divided. Some of the languages L1-L34 can be in several language packages LP1-LP9, due, for example, to their world-wide position. Examples of such languages in the embodiment are UK_English=L6, German=L7, Russian=L11, French=L13, Italian=L16, and US_English=L29. At least one of the language packages LP1-LP9 can be selected for use in the user interface VUI/GUI of the device 10, particularly in the speech recognition SR implementing the voice user interface VUI.

The language-specific data belonging to the language packages LP1-LP9 can, in the case of each language L1-L34, include, for example, possible commands in the language L1-L34 in question, for controlling the functions of the device 10. On the other hand, in the case of, for example, the world languages L6, L7, L11, L13, L16, L29, the language data can also include important information for the speech-recognition engine SR on speech styles/accents of the languages L6, L7, L11, L13, L16, L29 in question in each geographical region (dialect-specific features), or even commands for the device 10 in the dialect in question. One example of this is the package Central Europe LP4, in which it is possible to use a language configuration optimized for Austrian/Swiss German, in place of native German. Generally, the language data can, however, be understood to include speech models supporting the languages L1-L34. In addition, a multi-language system can also include model data for text-based language recognition.

For example, a registering functionality 17 implemented by software can be arranged in the device 10 according to the invention shown in FIG. 1, which can, according to one embodiment, request the user for language information on the desired language package LP1-LP9 to be used in the device 10, and particularly for selecting the user interface language VUIL/UIL. The language information can include information on at least one language for at least one user interface. On the basis of this registered language information, the device 10 can, at its simplest, select the language package to be used.

If the device 10 cannot perform the selection unambiguously on the basis of the first language information, the device 10 can be registered, for example, by requesting the user in addition for a second language for a second user interface. Such situations requiring two questions may occur, for example, if the first language L6 selected by the user belongs to several, for example, at least two language packages LP1-LP7. On the basis of these registered first and second language L6, L11, the device 10 can perform the selection of the language package unambiguously, according to language package linked to the each language-selection alternative and arranged in connection with the device 10. According to one embodiment, the first language can be a voice user interface language VUIL i.e. a speech language and the second language can be a user interface language UIL. The opposite sequence of selection may also be possible.

The software implementation of the selection functionality 17 can be created, for example, in such a way that the processor 13 of the device 10 is used to perform a group of preset commands in a predefined sequence. The functionality 17 can be stored in the memory MEM of the device 10, for example, as an operating-system-level updatable computer program.

FIG. 2 shows one embodiment of the language packages LP1-LP9 arranged in the memory MEM of the device 10. In it, each language package LP1-LP9 has grouped in it the languages L1-LP34 belonging to it. In this case, several language packages LP1-LP9, organized by language in a selected manner, are stored in the memory MEM of the device 10, from which packages LP1-LP9 the device 10 can, according to one embodiment, automatically select the most suitable, on the basis of the language information obtained from the user. In practice, only one language package LP1 can be in use at any one time, due, for example, to the limited processing and working-memory WHEM capacities of the device 10 and the speech recognition SR.

In addition to the above, if the language L6, which it is wished to use in the voice user interface VUI and subsequently also in the speech recognition SR each, belongs to several language packages LP1-LP9, being, for example, one of the so-called 'world languages' L6, L7, L11, L13, L16, L29, then this case would complicate the selection of the language package LP1 to be used in the device 10, especially if it is made by the user. In that case, the user may unintentionally select the voice language VUIL that they wish to use in the voice user interface VUI from a language package with a language model that does not correspond to the language model that they speak.

A second example of a problematic situation can be one in which the user selects the voice language VUIL, which they wish to use in the voice user interface VUI, from one language package LP2 and the UI-language, which they wish to use in the graphical user interface GUI, from another language package LP1. For the reasons referred to above, such a selection could not be implemented in practice, the said situation being difficult for the device 10 to process, to say nothing of the confusion that it might cause the user.

FIGS. 3d and 3e show partly one embodiment for selecting a language package LPx from a look-up table 18 of the language packages LP1-LP9 arranged in the memory MEM of the device 10. A suitable language package LPx can be selected for use from the look-up table 18, on the basis of the language information (VUIL, UIL) given to the device 10 by the user. In the look-up table 18 can be operated with the program 17.

Generally, information on the languages L1-L34 belonging to each language package LP1-LP9 is arranged in the look-up table 18. Particularly, the look-up table 18 may be grouped in a desired manner, for example, from all, or at least most of the possible voice-language/UI-language VUIL/UIL combinations (a-g) and possible (non-unambiguous) special cases (FIG. 3e), and the language package LP1-LP9 set to be selected in the case of each combination (a-g, special_cases). It must be understood that FIG. 3d does not show the entire look-up table, but that the table continues from section g, to include at least all of the possible language-selection combinations.

For each language L1-L34, it is also possible to set a so-called native-language package, which the device 10 will select as a default value, if either of the selected user interface languages VUIL/UIL has no meaning, or if it is completely impossible for the device 10 to select a suitable language package, in the case of 'weirder' language combinations received from the user. A native-language package can also be set to be selected for the languages L6, L7, L11, L13, L16, L29, which appear in several language packages LP1-LP9, which native-language package can be defined, for example, from the home regions/countries of the languages L6, L7, L11, L13, L16, L29. Table 3c shows an example of a list of the native default language packages set for these 'world languages'.

FIG. 3e shows an example of part of a look-up table 18, which is applied if both the voice language VUIL and the user interface language UIL belong to several language packages LP1-LP9, of which at least some packages are common to both languages. In order to deal out such a situation, a language package set to be selected for each pair of languages can be set in a selected manner. The manner of selection for special cases is not crucial, nor can it even necessarily even be linked to any particular criterion, instead it can be defined, for example, according to a decision of the application developer.

According to one embodiment, the sequence of the alternative language-pairs can be made such that the most probable selection alternatives are at the upper end of Table 18 and the least probable at the lower end. According to one embodiment, the look-up table 18 can, however, be arranged from all, or at least most of the language-selection pairs VUIL/UIL, allowing the most suitable language package to be selected for the user in each language-selection case.

Figure 4:
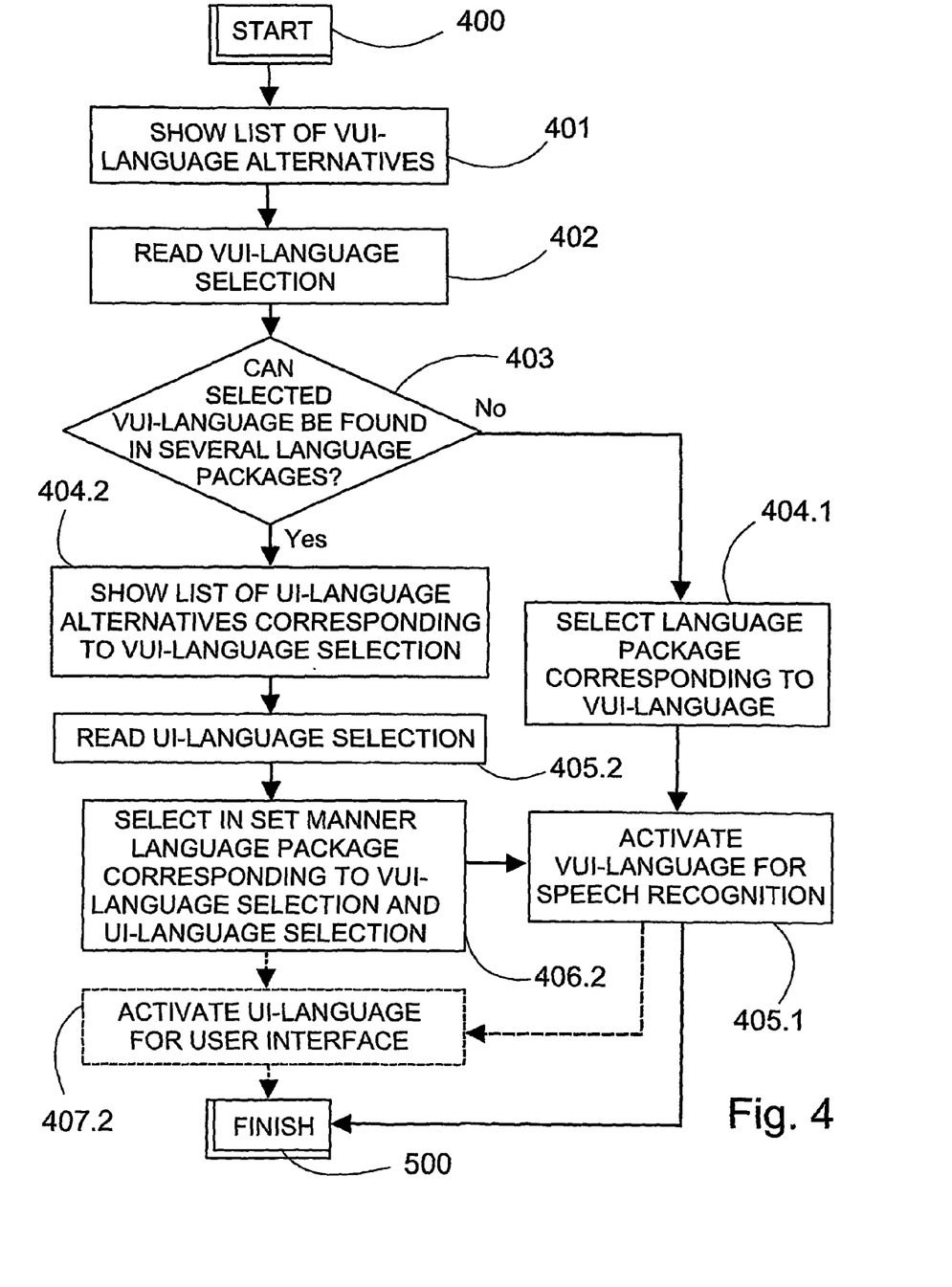
FIG. 4 shows a flow diagram of one embodiment of the method according to the invention in selecting a language package.

FIG. 4 shows one embodiment of the language-package selection method according to the invention in a device 10. The device 10 itself, or alternatively the user can activate the language-package selection procedure 17 (stage 400). Activation can be spontaneous, for example, the first time that the device 10 is used. The user can express a need to change the language package, should they for some reason wish to change the speech language VUIL that they use. In that case, if the new speech language VUIL can be found from the language package LP1 that is presently active in the device 10, there will be no need to perform the language-package selection procedure 17. If, on the other hand, the new speech language VUIL is not found in the present language package LP1, the language-package-selection functionality must be activated, in order to select a new language package LPx (x=1-9) and a new language Lx (x=1-34) from it, for example, at least for speech recognition.

In the embodiment described, once the selection procedure 17 has been initiated, the device 10 shows, for example, on its display component 19, a list of all the language alternatives L1-L34 that can be selected (stage 401). The selection procedure can start from the selection of a language Lx for either the voice user interface VUI (VUIL), or, on the other hand, also for the user interface GUI (UIL). Stated generally, the device 10 can register, for example, by requesting the user for a first language L1/L6 for at least one user interface VUI, UI.

In this embodiment, the user provides the device 10 with information on the desired first language, i.e. now the voice user interface language, i.e. the speech language VUIL. The device 10 registers the user's language selection (stage 402) and the software functionality 17 investigates whether the VUI-language VUIL selected by the user can be found in more than one language package LP1-LP9 (stage 403). The language packages LP1-LP9 can be arranged in the memory MM of the device in the form of files, each of which has its own ID identifier. The language packages can also contain information on the regions/countries that the package LP1-LP9 has been set to signify. The device 10 performs the search operation from the look-up table 18 arranged in its memory MEM, or from tables according to FIGS. 3a, 3b. In order to perform the search operation, language-language package information containing data on the one or several language packages LP1-LP9, to which each language L1-L34 is arranged to belong, is arranged in the manner described above in the device 10.

If the VUIL-language selected or entered by the user cannot be found from more than one language package, the language selection made by the user is unambiguous. Such a situation can arise, if the language is a so-called less-spoken language. On this basis, the device 10 selects the language package LP1 corresponding to the VUI-language VUIL selected by the user and loads it into the working memory WMEM of the device 10 and activates it to be used in speech recognition SR (stages 404.1 and 405.1). At the same time, the language package LP1 in question can be set in the permanent configurations of the device 10, in which case the selection of the language package LP1 need not always be performed again whenever the device 10 is subsequently started. The speech-recognition functionality SR loads the information on the language package LP1, which it is desired to use, and more particularly on the language L1, every time the device is switched on and when the voice user interface VUI is activated.

If, on the other hand, the look-up table/list analysis performed by the device 10 in stage 403 shows that the VUI-language VUIL stated by the user can be found in several language packages LP1-LP9, the selection of the language package LP1-LP9 is no longer unambiguous. Such a situation arises in the case of widely-spoken languages L6, L7, L11, L13, L16, L29, which are arranged in several language packages, as previously described. Some, though in no way restrictive examples of these languages are, in addition to the languages L6, L7, L11, L13, L16, L29 referred to above, also Spanish and Portuguese with their various dialects. The device 10 now requires UI-language information, in order to decide the selection of the language package.

In this case, stage 403 can be followed with a second list of second language alternatives to be shown to the user, for the second user interface GUI (stage 404.2). This second list can be, for example, limited, but also complete. In the limited list, only the second-language alternatives may be shown, which appear in the same language package LP1 together with the first selected language L6. If the list is shown in a complete form, then in the case of a non-co-operative user, in which case inappropriate language selections are also possible, the native-language-package information (FIG. 3c) and the special-situation partitions of the look-up table 18 (FIG. 3e) are applied.

The device 10 registers the language selection L1 performed from the list by the user (stage 405.2). Next, the device 10 selects the language package LP1 to be used in the device 10 and particularly in the speech recognition SR of the voice user interface VUI, from the look-up table 18 (FIG. 3) arranged in its memory MEM, on the basis of the first and second, i.e. now VUI and UI-language selection L6, L1 made by the user.

If the selected languages VUIL and UIL do not have a single common language package, the selection can be performed according to the native-language package linked to the selected voice language VUIL. If the second, in this case the latter of the language selections L1 made by the user appears in only one language package LP1, the selection of the language package to be used is unambiguous. The device 10 then selects for use the language package LP1, in which this second language L1 appears. If the VUIL language and the UIL language are the same and appear in only one common language package, the language package is selected according to the native-language-package link. However, if both language selections L6, L7 appear in several, i.e. now in at least two of the same language packages LP1-LP9, the device 10 then selects the language package LP1 according to the special situations (FIG. 3e) defined in the look-up table 18. In that case, the language package LP3 (Northern Europe) should be selected, according to the look-up table 18. Further, if all languages are presented in stage 404.2 without elimination being performed according to the first language VUIL, and the second language UIL does not have a single language package in common with the first language VUIL, the language package is selected according to the speech language VUIL. Thus, also in such a situation the most appropriate language package, according to the language selection, is provided.

From stage 406.2, the procedure moves to the activation of the VUI-language (stage 405.1), and it is possible to act in the manner described above.

Both stages 405.1 and 406.2 can be followed by the possible activation of the UI-language, which is performed on the basis of the language-package-selection stages described above (stage 407.2), after which the selection procedure can be terminated (stage 500).

The above describes the selection of a language package LP1-LP9 in a situation, in which the voice language VUIL is first registered, followed by the user interface language UIL. The opposite registration sequence is also possible. In that case, when the UI-language UIL is found in stage 403 from only one language package, stage 404.1 is performed, and after that a sub-stage, which is not described, for selecting the VUIL language from the unambiguous language package defined by the UI-language UIL.

Correspondingly, if the UI-language is found in stage 403 from several language packages, stages 404.2-406.2 are performed in a corresponding sequence to select the VUI-language VUIL. Thus the variation of the question sequence of the languages UIL, VUIL has practically no effect in increasing the complexity of the selection procedure.

Basing the selection on the user interface-language information provided by the user also achieves the advantage that not only is the most suitable language package LP1 used, but also additional certainty is given to the operation of the speech recognition SR. This is because account is taken of the typical dialect of the language appearing in the geographical, or even national region in question. When striving to achieve the most natural operation for the user interface, the interaction between the user and the device 10, for example, in the case of performing different configurations selections, is hoped to be minimized, which property is also achieved by use of the invention.

Above, the invention is described as an individual embodiment. It should be noted that one versed in the art can vary the software procedure described above and perhaps perform it in a manner differing from the arrangement described above. In addition, it is also possible to add various additional stages, for example, help functions and error-state processing.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one versed in the art.

The invention claimed is:

1. An apparatus comprising at least one processor and at least one memory storing computer program code, wherein the at least one memory and stored computer program code are configured, with the at least one processor, to cause the apparatus to at least:
   determine a language selected for a first user interface;
   determine, based at least in part on the language selected for the first user interface, one or more language packages associated with the language selected for the first user interface, the one or more language packages being determined from among a plurality of available language packages, each of said plurality of language packages having associated therewith a plurality of languages, where at least some of said plurality of languages are associated with more than one of said plurality of language packages;
   in an instance in which only one language package is determined to be associated with the language selected for the first user interface:
   select the determined language package for use by a speech recognition system; and
   in an instance in which multiple language packages are determined to be associated with the language selected for the first user interface:
   determine a language selected for a second user interface; and
   select one of the determined language packages based on the language selected for the first user interface and the language selected for the second user interface for use by the speech recognition system.

2. The apparatus according to claim 1, where a native language package is set for each language.

3. The apparatus according to claim 1, where the language selected for the first user interface is selected as a device control user interface language, and where the language selected for the second user interface is selected as a graphical user interface language.

4. The apparatus according to claim 1, wherein the at least one memory and stored computer program code are configured, with the at least one processor, to cause the apparatus to determine one or more language packages by accessing a look-up table.

5. The apparatus according to claim 4, where voice user interface language and user interface language combinations are arranged in the look-up table, where one of the plurality of language packages that is suitable for selection for each voice user interface language and user interface language combination is linked.

6. The apparatus according to claim 1, where said apparatus is embodied as a mobile station.

7. The apparatus according to claim 1, wherein at least one of the one or more language packages has associated therewith a plurality of languages characteristic of a particular geographical region.

8. A method comprising:
   determining a language selected for a first user interface;
   determining, based at least in part on the language selected for the first user interface, one or more language packages associated with the language selected for the first user interface, the one or more language packages being determined from among a plurality of available language packages, each of said plurality of language packages having associated therewith a plurality of languages, where at least some of said plurality of languages are associated with more than one of said plurality of language packages;

in an instance in which only one language package is determined to be associated with the language selected for the first user interface:
selecting, by a processor, the determined language package for use by a speech recognition system; and in an instance in which multiple language packages are determined to be associated with the language selected for the first user interface:
determining a language selected for a second user interface; and
selecting, by the processor, one of the determined language packages based on the language selected for the first user interface and the language selected for the second user interface for use by the speech recognition system.

9. The method of claim 8, wherein the first user interface comprises a device control user interface and the second user interface comprises a graphical user interface.

10. The method according to claim 8, where a native-language package is set for each language.

11. The method according to claim 8, wherein determining one or more language packages comprises accessing a look-up table and determining one or more language packages based on the look-up table.

12. The method according to claim 11, where voice user interface language and user interface language combinations are arranged in the look-up table, where one of the plurality of language packages that is suitable for selection for each voice user interface language and user interface language combination is linked.

13. The method according to claim 8, wherein at least one of the one or more language packages has associated therewith a plurality of languages characteristic of a particular geographical region.

14. A computer program product comprising at least one non-transitory computer-readable storage medium having computer-readable program instructions stored therein, the computer-readable program instructions comprising:

program instructions configured to determine a language selected for a first user interface;

program instructions configured to determine, based at least in part on the language selected for the first user interface, one or more language packages associated with the language selected for the first user interface, the one or more language packages being determined from among a plurality of available language packages, each of said plurality of language packages having associated therewith a plurality of languages, where at least some of said plurality of languages are associated with more than one of said plurality of language packages;

program instructions configured, in an instance in which only one language package is determined to be associated with the language selected for the first user interface, to:
select the determined language package for use by a speech recognition system; and program instructions configured, in an instance in which multiple language packages are determined to be associated with the language selected for the first user interface, to:
determine a language selected for a second user interface; and
select one of the determined language packages based on the language selected for the first user interface and the language selected for the second user interface for use by the speech recognition system.

15. The computer program product according to claim 14, wherein the first user interface comprises a device control user interface and the second user interface comprises a graphical user interface.

16. The computer program product according to claim 14, wherein the program instructions configured to determine one or more language packages comprise program instructions configured to determine one or more language packages by accessing a look-up table.

17. The computer program product according to claim 16, where voice user interface language and user interface language combinations are arranged in the look-up table, where one of the plurality of language packages that is suitable for selection for each voice user interface language and user interface language combination is linked.

18. The computer program product according to claim 14, embodied in a mobile device having wireless communication capability.

* * * * *